United States Patent [19]
James et al.

[11] Patent Number: 5,339,204
[45] Date of Patent: Aug. 16, 1994

[54] SYSTEM AND METHOD FOR SERVOWRITING A MAGNETIC DISK DRIVE

[75] Inventors: David T. James, Catisfield; Anthony W. Leonard, Rowlands Castle; Peter J. Elliott, Alresford, all of England

[73] Assignee: International Business Machines Corporation, Armonk, N.Y.

[21] Appl. No.: 989,409

[22] Filed: Dec. 11, 1992

[30] Foreign Application Priority Data

Dec. 12, 1991 [GB] United Kingdom ............... 91311594

[51] Int. Cl.$^5$ .............................................. G11B 5/09
[52] U.S. Cl. ................... 360/51; 360/77.03; 360/97.03; 369/13
[58] Field of Search ............ 360/77.03, 51, 59, 78.11, 360/97.02–97.04, 114; 369/13, 14

[56] References Cited

U.S. PATENT DOCUMENTS

| | | | |
|---|---|---|---|
| 4,068,268 | 1/1978 | Idemoto et al. | 360/78.04 |
| 4,131,920 | 12/1978 | Berger | 360/51 |
| 4,531,167 | 7/1985 | Berger | 360/77.02 |
| 4,783,705 | 11/1988 | Moon et al. | 360/77.08 |
| 4,980,783 | 12/1990 | Moir et al. | 360/77.02 |
| 5,243,479 | 9/1993 | Nakagoshi et al. | 360/98.01 |

FOREIGN PATENT DOCUMENTS

| | | | |
|---|---|---|---|
| 0107380 | 9/1983 | European Pat. Off. | G11B 21/08 |
| 0311859 | 9/1988 | European Pat. Off. | G11B 21/08 |
| 327207 | 8/1989 | European Pat. Off. | |

OTHER PUBLICATIONS

IBM Technical Disclosure Bulletin vol. 27 No. 88, pp. 4877–4878, "Servowriter Reference Clocks From Shaft Encoder" Jan. '85.
IBM TDB vol. 33 No. 5, pp. 310–311, Oct. '90, "Regenerative Clock Technical for Servo Track Writers".
IBM TDB vol. 33 No. 11 p. 428; Apr. '91, "Head Positioning to Servowrite Magnetic Disk Files".
Mee and Daniel, "Magnetic Recording vol. 2, Computer Data Storage" 1988 McGraw-Hill Chapter 6.

*Primary Examiner*—Aristotelis Psitos
*Assistant Examiner*—James T. Wilson
*Attorney, Agent, or Firm*—Baker, Maxham, Jester & Meador

[57] ABSTRACT

A magnetic disk drive is provided with a system and method for writing a servo pattern after the head disk assembly (HDA) is sealed. A clock track is written inside the sealed HDA using a Monte Carlo technique. The clock track is read by a magneto-optical head through a window in the HDA housing, and the time transitions therefrom are used to control the product heads. The entire servo pattern for the disk drive is thus written with the HDA unit completely sealed.

9 Claims, 3 Drawing Sheets

SYSTEM AND METHOD FOR SERVOWRITING A MAGNETIC DISK DRIVE

FIELD OF THE INVENTION

This invention relates to a system and method for servowriting a magnetic disk drive, and in particular to a system and method that can be used with a sealed HDA, thereby obviating the need to servowrite in a clean room.

BACKGROUND OF THE INVENTION

Disk drives are data storage devices having a stack of one or more magnetic recording disks mounted for rotation about a common axis. Data is stored on the disks in concentric tracks, and is read from or written to the disk surfaces by transducing heads. There is typically one read/write head per disk surface, although only a single head/disk surface combination normally reads or writes user data at any given time. All tile heads are ganged together common motion on an actuator, which moves the heads radially in and nut across their respective disk surfaces. In most modern disk drives the heads glide over the rotating disk surface at such a low height ($<1$ µm) that any dust or other contamination on the disk surface is likely to result in a head crash, loss of data, and possible damage to the head. For this reason, the disks, actuator, and heads are placed in a sealed unit known as the head-disk assembly (HDA).

The movement of the actuator is controlled by a servo system, utilizing servo information recorded on one or more of the disks. By reading this servo information, the actual radial positions of the heads can be determined, and after comparison with the desired head radial positions, control signals can be sent to move the actuator accordingly. Two types of servo system are commonly used. In the first, a dedicated servo system, one whole disk surface (a servo disk) is used exclusively to store servo information. A servo head constantly reads this information to provide a continuous signal indicating the position of the servo head with respect to the servo disk, and by extension, the location of all the other data heads on that actuator. In the second type of servo system, sectors of servo information are interspersed with sectors of data on each disk surface (this type of system is known as a sector servo). As a head follows the data track around, it regularly reads a fresh sample of servo information from each servo sector with which to control its position. In both types of servo system there are servo guardbands at the inner and outer diameters to indicate the radial limits of the data storage regions on the disks. Often one of the servo guardband regions is used as a landing zone for the head when the disk drive is powered down.

The servo pattern therefore comprises whole or sectors of concentric tracks. Each track is identified by an index number, allowing the radial position to the nearest whole number of tracks to be easily determined. Finer radial positional information is provided by an error signal derived from the relative strengths of signals from two or more adjacent servo tracks. The angular or azimuthal position of the head is obtained from circumferentially aligned transitions in the servo tracks, with some particular mark on the tracks being used to define the zero angle. The radial and angular measurements, corresponding to r and $\theta$ in polar coordinates, completely specify the position of the head over the disk surface.

The initial writing or the servo patterns onto the disk is an important step in the manufacture of disk drives. Clearly it is essential for the servo tracks to be written as accurately as possible, whilst at the same time great care must be taken to prevent contamination of the disk surfaces. Conventionally this has been achieved by using specialized servo-writing apparatus, with its own transducer head. The servo-writer is first used to write a circular clock track on the disk, providing a series of transitions indicating angular position around the disk. In one common method servo tracks at other radii are then written using the product head (i.e. the one that is actually part of the disk drive). Angular information, in the form of timing information telling the product head when to write certain transitions, is provided by synchronization with the clock track, which is simultaneously read by the servo-writer. The servo-writer typically includes a long-arm laser interferometer to maintain the product head at a constant radius. In this manner, circular servo tracks all referenced in angle to the clock track can be obtained.

While conventional servo-writers are capable of producing highly accurate servo patterns, they have a major drawback in terms of cost. This is firstly because the machines themselves are bulky and expensive, and require a large optical (vibration-isolation) table. Secondly, because the disk surfaces are exposed during the servo-writing process, this process must be performed in a clean room, which again adds to cost. Constraints on the amount of affordable clean room space or number or servo-writers limit the total throughput of a disk drive production line. For this reason, there have been various attempts to find simpler, less expensive methods or servo writing.

EPA 327207 discloses a method in which only one disk is servo-written conventionally. The remaining disk surfaces are servo-written after the HDA has been scaled by effectively copying the pattern from the disk that already has the servo pattern on. Likewise, U.S. Pat. No. 4,531,167 discloses a servo-writer that copies servo patterns onto disks inside the HDA from a master disk cartridge attached to the disk spindle outside the HDA. The master disk cartridge is removed once the disk drive has been servo-written. Neither of these techniques completely avoids using a clean room, and the method of U.S. Pat. No. 4,531,167 is only applicable to certain designs of disk drive.

An alternative to using a magnetic clock track is disclosed in IBM TDB Vol. 1-85, pp. 4877-4878 "Servowriter Reference Clocks From Shaft Encoder," which proposes using an optical guide disk with angular information marked on it attached to the main spindle. A clock track is read from the disk using a Moire fringe effect to supply timing information to the product heads which write the actual servo pattern. A similar approach is used with the IBM disk drive WD-L40, in which clock information is read from a paper pattern wrapped around the disk shaft. In both cases the optical guide has far fewer transitions than are required for the servo pattern, so that the frequency of the signal from the guide must be multiplied up to produce the servo pattern. It has proved difficult with such techniques however to obtain the high accuracy necessary for the ever-increasing density of data stored on disk surfaces.

DISCLOSURE OF THE INVENTION

Accordingly, the invention provides a system and method for servo-writing a magnetic disk drive which includes a head-disk assembly (HDA) containing within a substantially sealed housing one or more coaxial, rotatable magnetic data storage disks, each disk data storage surface having a respective magnetic transducer head for data transfer therewith, and means for moving the transducer heads in unison radially across the disk surfaces. First, a circular clock track is written within the sealed HDA at radius R1 using a Monte Carlo technique. Next, the transducer heads are moved to radius R2. Then, a magneto-optical head positioned outside the sealed HDA is used to read the clock track by measuring the change in polarization of light reflected from the disk surface, while simultaneously the transducer heads are used to write a servo track at radius R2, with the timing of the transitions for the servo track at radius R2 being determined by the timing of the transitions read from the clock track.

An important advantage of the present invention is that the entire servo-writing process takes place after the disks and heads have already been sealed within the HDA. This eliminates the need for expensive cleanroom space, which is often a limiting factor in factory throughput, and the magneto-optical equipment used is cheaper and much more compact than conventional servowriters. Thus use of the invention saves money, and can lead to increased production rates.

Furthermore, the invention can actually produce a more accurate servo pattern, because when conventional servo-writers read the clock track, the head they use is subject to some jitter, which translates itself into small errors in the servo pattern. By contrast, the MO head for use with the present invention can be firmly mounted, thereby eliminating any jitter. One further advantage of the present invention is that servo-writing at HDA level benefits from the full structural rigidity of the disk drive. By contrast, some of the smaller disk drives that are becoming increasingly common have relatively weak disk stacks, and if servo-written without the support of the HDA casting are liable to bend or suffer other distortions which would then be reflected in the resulting servo pattern.

Generally the whole disk drive will be servo-written by repeatedly moving the transducer head(s) to a new radius; reading the clock track by measuring the change in polarization of light reflected from the disk surface using a magneto-optical head outside said sealed HDA; and simultaneously with said step of reading the clock track, writing a servo track at the new radius with said transducer head(s), wherein the timing of the transitions for said servo track at the new radius is determined by the timing of the transitions read from said clock track.

Typically, the Monte Carlo technique used in the present invention comprises the following steps: writing a trial clock track with an estimated transition frequency; verifying against predetermined specifications the closure and number of transitions of said trial clock track; and repeating the above steps until a clock track is written that meets said predetermined specifications. Usually fluctuations in the disk rotation speed introduce sufficient variations between trials to lead to an acceptable clock track, without the need to change the estimated transition frequency.

In a preferred embodiment the clock track is written on one of the outermost disk surfaces (i.e. at the top or bottom of the disk stack). The reason for this is simply that it is much easier to read the clock track in such a location, since the disk surface would be relatively close to the MO head and it should be possible to use only a single window in the HDA. There is no reason in principle why the clock track could not be written on a different disk surface, providing it was accessible optically, but the practical difficulties would be very much greater.

Preferably the clock track is written outside the intended location of the o normal servo outer guardband, to allow a servo pattern (dedicated or sector) to be written directly onto any chosen disk surface, including the one with the clock track on. In fact writing the clock track inside the inner guardband would also permit this, but clock tracks have been conventionally written around the outer diameter, primarily because the greater relative velocity between the head and the disk surface has produced a stronger magnetic readback signal. Clearly this reasoning does not apply to a magneto-optically sensed signal, but the greater bit size at the outer diameter does make it easier to read a clock track there.

The invention further provides a disk drive including a head-disk assembly (HDA) containing within a substantially sealed, opaque housing, a disk stack comprising one or more coaxial, rotatable magnetic data storage disks, each disk data storage surface having a respective magnetic transducer head for data transfer therewith; and means for moving the transducer head(s) in unison radially across the disk surfaces, said disk drive being characterized in that the HDA housing includes a transparent window located at one axial end of the disk stack through which an optical beam directed at a disk surface may enter the HDA, and through which the component of said optical beam reflected from the disk surface may exit the HDA.

DETAILED DESCRIPTION

Figure 1:
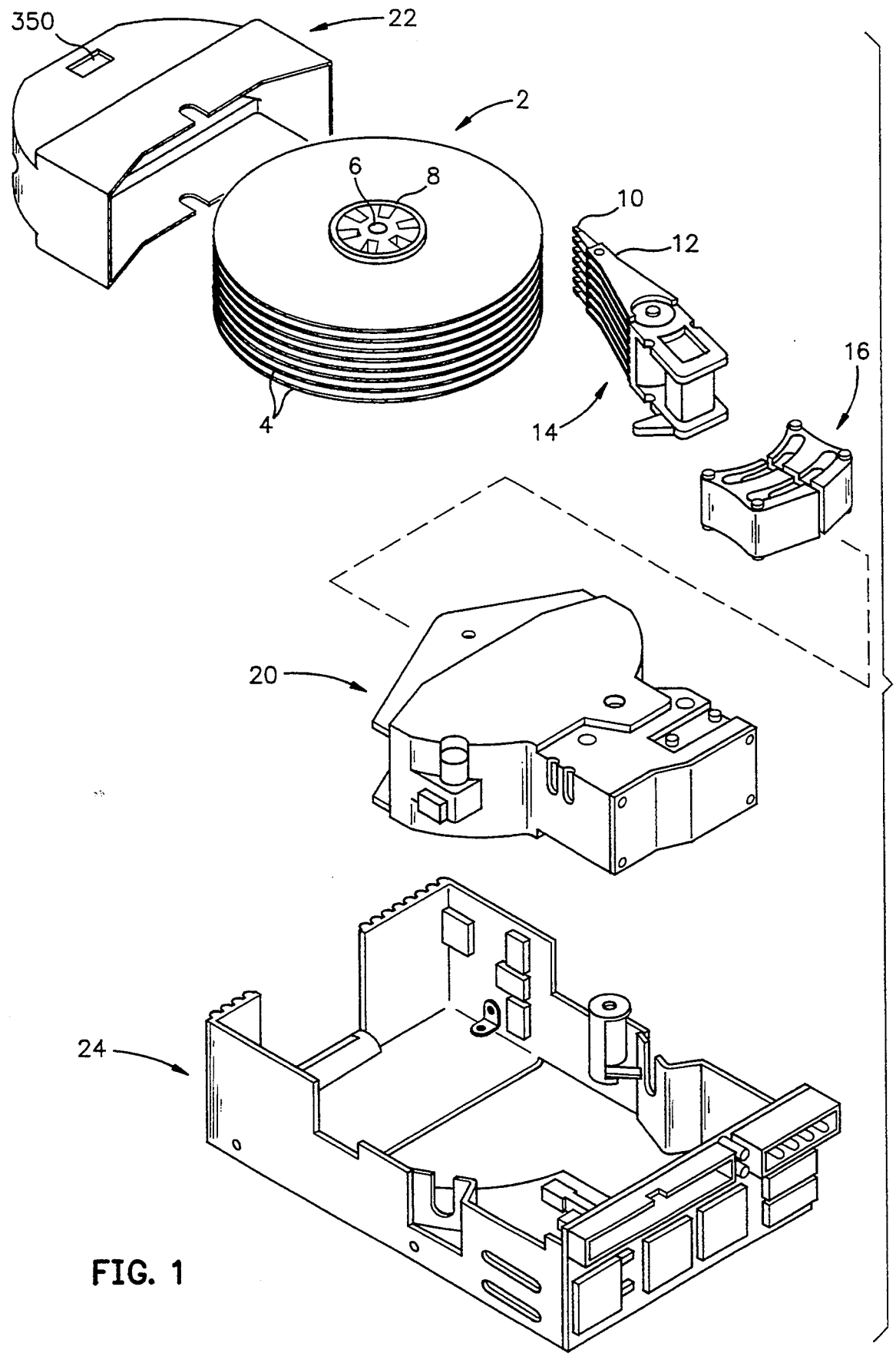
FIG. 1 shows an exploded simplified view of a magnetic disk drive.

FIG. 1 shows a simplified diagram of the main components of a disk drive. A disk stack 2 comprises data storage disks 4 mounted coaxially on a shaft 6 using a hub and clamp 8. The shaft is rotated by an electric motor (in this case hidden within the hub). Each data storage surface has a respective transducer head 10, supported by an arm 12 attached to an actuator 14. The actuator is rotated using voice coil motor magnets 16 to move the heads in unison radially across the disk surfaces (the invention is equally applicable to disk drives with linear or radial actuators). To prevent contamination of the disk surfaces, the disk stack (i.e. disks, spindle, hub, clamp and motor), along with the actuator and attached heads, are contained within a sealed unit, referred to as the head disk assembly (HDA). The HDA housing comprises a casting 20 which supports the disk spindle at both ends and gives the disk drive its structural rigidity, plus a mating cover 22. The HDA cover has a transparent window in 350, which is positioned for viewing a circular clock track on one of the disks to be explained in more detail hereinbelow. Other features typically included in the HDA housing, such as a breather filter, are not shown. The HDA is shock-mounted within a casing 24, which also contains most of the electronics associated with the disk drive.

Figure 2:
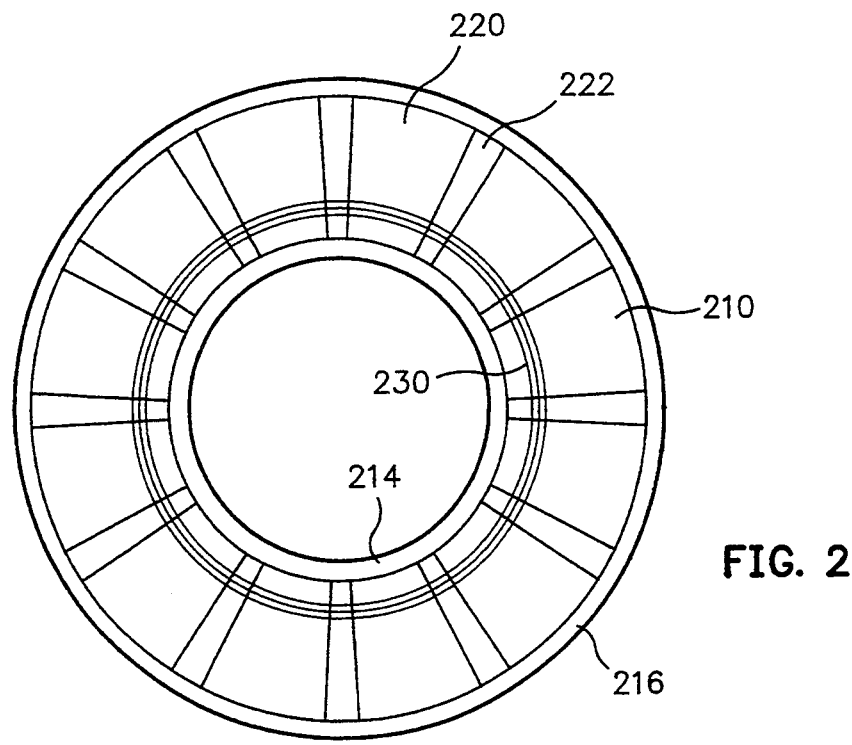
FIG. 2 shows an example of a sector servo pattern used in a magnetic disk drive.

Movement of the actuator (and hence the heads) is controlled by a servo system, utilizing servo information recorded on one or more disk surfaces. FIG. 2 shows in simplified form sector servo information recorded on one surface of a disk drive (note that the invention is equally applicable to a dedicated servo system). The disk surface is divided up into a series of concentric tracks 230 between inner and outer radii (for clarity only a few tracks are shown). These tracks are circumferentially split up into sectors 220 available for data storage alternating with sectors 222 information, as is well known in the art. Inner and outer servo guardbands (214, 216 respectively) are not used for data storage, but rather indicate the limits of the data recording band of the disk. There is a similar arrangement of servo information on each disk surface.

The method of writing the servo information onto the disk surfaces will now be described. The first step is to write a circular clock track on one of the two outermost disk surfaces (i.e. the ones at either axial end of the disk stack), holding the head at a constant radius. Extra current is supplied to the actuator to mechanically compress the end stops that restrict actuator travel beyond their normal limit, with the result that the clock track is written some 15–20 $\mu m$ (a couple of track widths) beyond the normal range or movement of the actuator, outside the servo outer guardband. The same technique, known as end stop compression, is widely used in conventional servo-writing processes. The transition frequency for writing the track is estimated based on the desired total of transitions in one revolution (360 degrees). When the start of the clock track is encountered again, after one full circle, the track is reread to see if it has the correct spacing between the first and last transitions (i.e. that the phase of the servo patterns at 0 and 360 degrees match each other properly). This is referred to as checking the closure of the track. If the phase patterns match properly and the desired number of transitions are present (this latter requirement is usually checked by means of a counter) then an acceptable clock track has been written—if not, another trial clock track is written, checked, and the whole process repeated until an acceptable track is obtained.

In principle, the transition frequency for each new trial clock track could be adjusted in accordance with the closure (or lack of it) for the previous clock track, but in practice however, minor variations in the rotational speed of the disk between trials render this superfluous. Instead a crystal-controlled oscillator having a fixed frequency is used for all the trial clock tracks, with the fluctuations in disk rotation speed producing a slightly different clock track each trial. Sooner or later one of these will represent an acceptable clock track. This Monte Carlo approach is well-known in the art (see e.g. U.S. Pat. No. 4,131,920, IBM TDB, Vol. 10-90, pp. 310-311, "Regenerative Clock Technique for Servo Track Writers") and normally takes only a few seconds per disk drive. It is important to note that the HDA is already sealed at this stage, since the clock track is written using the product head without the need for external access to the disks.

The final servo pattern is now derived from the clock track, whilst still maintaining the HDA as a sealed unit. This involves reading through the window 350 the clock track and writing a servo track simultaneously at different radii. In accordance with the invention, this is achieved by reading through the window 350 the clock track magneto-optically from outside the HDA to provide timing information for the product head which writes the servo pattern.

Figure 3A:
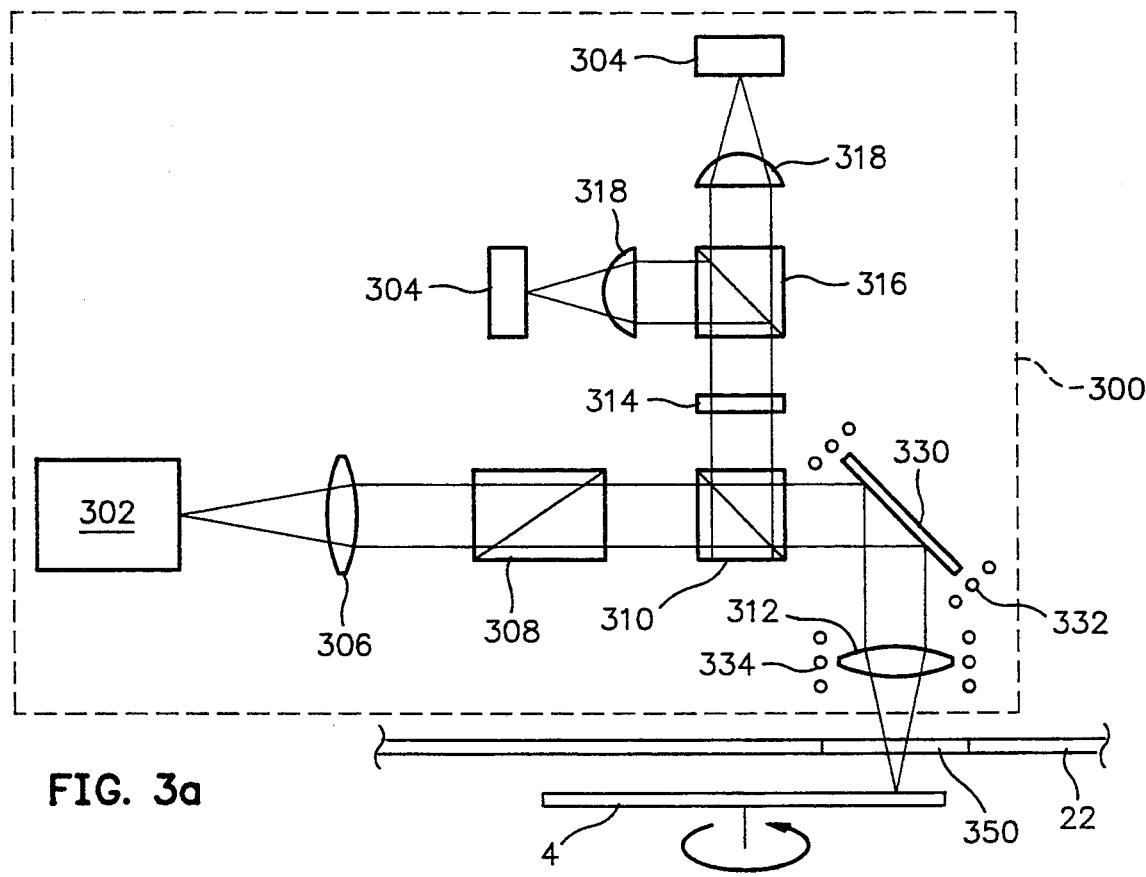
FIG. 3a shows a schematic diagram of a conventional magneto-optical (MO) head.

Conventional magneto-optical (MO) heads can be bought "off-the-shelf" for use in magneto-optical recorders. A typical example is shown in FIG. 3a. Since such heads are well known in the art, it will only be described briefly. The MO head 300 comprises three main components: a diode laser 302, optics, and photo-diode detectors 304. Light (with a wavelength of say 820 nm) passes through a collimating lens 306, polarizer 308, and beam splitter 310, before being reflected by mirror 330 and focussed by an objective lens 312 onto the disk surface 4 through a window 350 in the HDA cover 22. Spot sizes of 1 $\mu m$ (micrometer) are achievable with conventional MO heads. Light reflected from the disk surface returns to the beam splitter, where this time it is directed through a linearizing phase plate 314 towards a polarizing beam splitter 316, which produces two beams which each pass through an astigmatic or cylindrical lens 318 to arrive at a photodiode detector 304.

Figure 4:
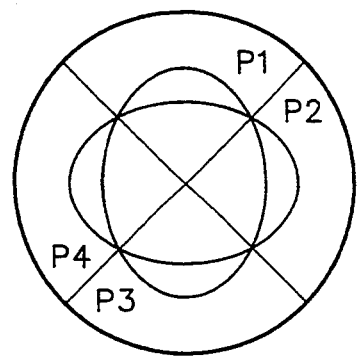
FIG. 4 shows the focussing quadrature detector from the MO head of FIG. 3.

A differential signal from the two photodiodes is used to measure the Kerr rotation of light reflected from the disk surface, and hence to detect magnetic transitions in the clock track. A quadrature photodiode with a cylindrical lens 318 is used to monitor the focus of the objective lens 312 onto the disk surface as illustrated in FIG. 4. The astigmatic or cylindrical lens forms an ellipse on the photodiode if the objective lens is not properly focussed. The orientation of the ellipse, calculated from signals (P1+P3)/(P2+P4), determines whether the objective lens needs to be moved nearer to or further from the disk surface, and appropriate command signals are sent to a focus control device 334 (a circle is produced on the quadrature detector when the objective lens is correctly focussed). Another control device 332 ensures that the mirror directs the beam correctly at the clock track. Further details about MO heads can be found in "Magnetic Recording, Vol. 2: Computer Data Storage," Ed. C, Denis Mee and Ed Daniel, 1988, McGraw-Hill (Chapter 6), and references therein.

Figure 5:
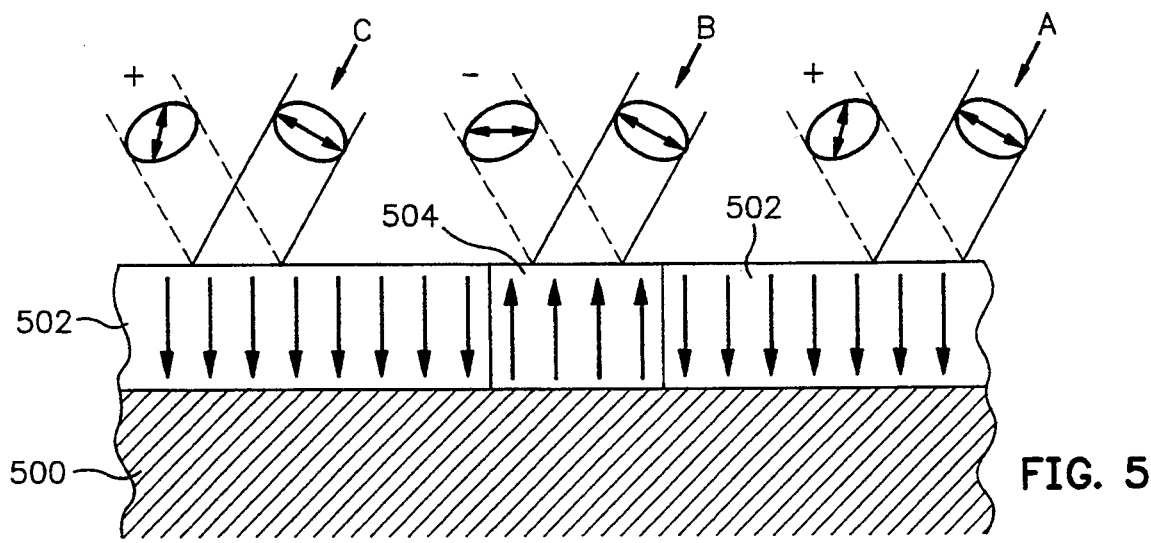
FIG. 5 shows a simplified and somewhat diagrammatic illustration of the Kerr rotation of polarized light on reflection from a magnetized surface.

The Kerr rotation of light reflected from a magnetized medium is shown in simplified form in FIG. 5. A substrate 500 is coated with a magnetic layer, which is magnetizable in two different directions 502, 504. Linearly polarized light beams A, B, and C are incident on the magnetic layer, and on reflection have their plane of polarization rotated as indicated, with beams A and C being rotated one way, and beam B in the opposite way (nb the plane of polarization actually always remains perpendicular to the direction of the beam; FIG. 5 however uses a somewhat distorted geometry to represent cross-sections through the beam). Measurements of the change in linear polarization therefore provide information about the direction of magnetization on the disk.

It will be noted that in FIG. 5 the direction of magnetization is vertical or perpendicular to the surface, whereas most disk drives have a horizontal direction of magnetization (i.e. parallel to the disk surface). In this second case simple normal incidence cannot be used for the MO read beam, because it will simply be reflected without experiencing any Kerr rotation (except possibly at the transition between oppositely magnetized segments). In practice therefore, the apparatus shown in FIG. 3a must be adapted for servowriting disk drives that use horizontal magnetic recording.

Figure 3B:
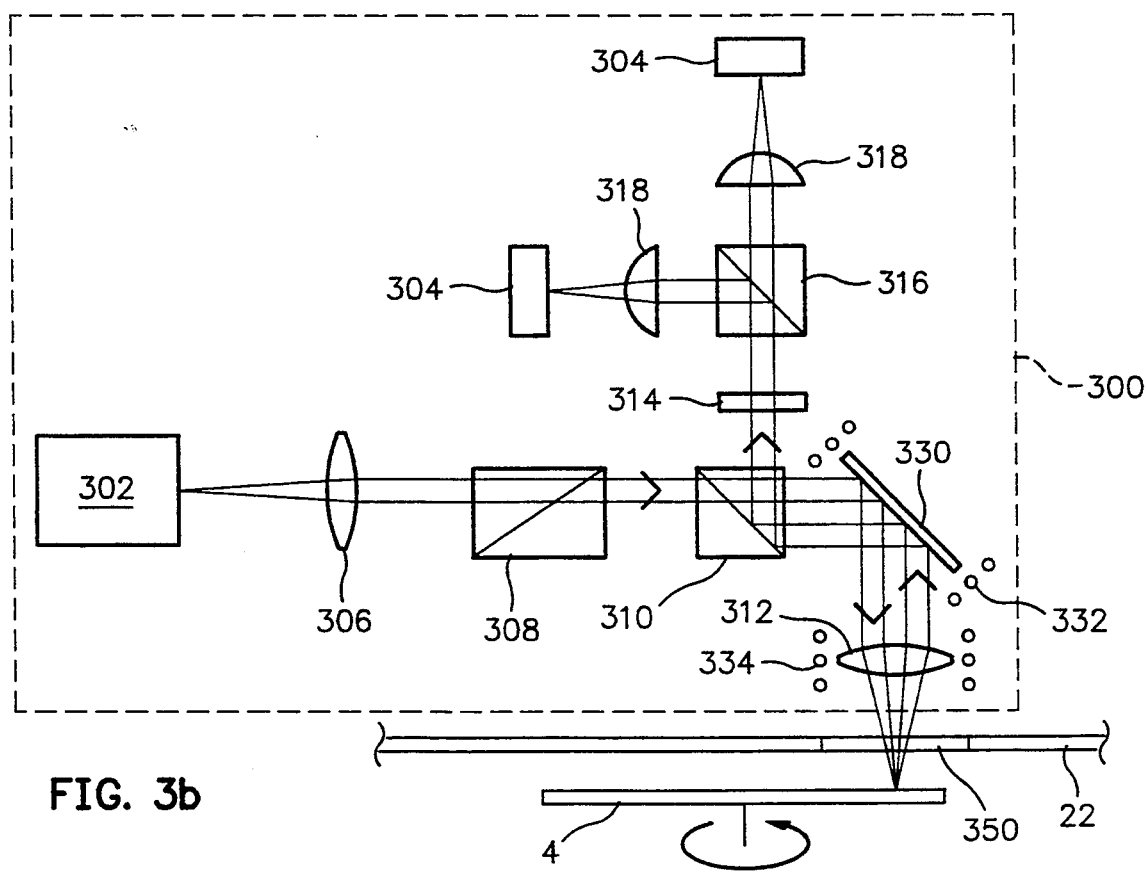
FIG. 3b shows a schematic diagram of the magneto-optical head FIG. 3a adapted for use with the method of the invention.

FIG. 3b illustrates a suitable modification of the MO head of FIG. 3a for use with the invention. Essentially, the laser beam has been narrowed and shifted upwards, so that it only illuminates one side of the objective lens 312. This beam is naturally inclined to the direction of normal incidence, and so will be sensitive to the Kerr effect. Some components (e.g. photodetectors 304) in FIG. 3b have simply been realigned so as to be centered on the beams passing through them. It should be noted that the beam splitter 310 is strictly no longer necessary, and can be replaced with a simple mirror in the path of the beam reflected from the disk. The size of the objective lens may have to be increased to obtain a sufficiently large angle of incidence (the required value of the angle of incidence is related to the readback signal to noise ratio). The differences between the MO heads of FIG. 3a and 3b will no doubt add to the cost of the latter, but only one such head is needed to servowrite many disk drives.

The skilled man will recognize that the optical arrangement shown in FIG. 3b is just one of many possible alternatives. One implementation would be to separate the input and output optics, so that only the incident beam is reflected off the tracking mirror 330, and focussed by objective lens 312. The reflected light would then be directed to a separate set of optics, which would need to perform some collimation before feeding the reflected signal onto detectors similar to those of FIG. 3b. Such an approach would allow a greater angle of incidence, but require more complicated apparatus, since the objective lens 312 and its focussing system 334 as shown in FIG. 3b would effectively have to be duplicated. Furthermore, making the paths of the incident and reflected beams as similar as possible as in FIG. 3b has the advantage of simplicity and will minimize distortion caused for example by the HDA window.

The MO head of FIG. 3b is used in accordance with the method of the invention to provide a signal indicating the transitions along the clock track. This timing signal is then used to control the write signal to the product head(s) writing the servo pattern at a different radii in the conventional manner. This is repeated with the product head at many different radii until the entire disk drive has been servo written. One known technique (see e.g. U.S. Pat. No. 4,068,268) of obtaining a high precision servo pattern is to shift the product heads less than one full width between writing adjacent tracks (i.e. overwriting a large portion of the previous track). The present invention is equally applicable whether the servo pattern is a sample or dedicated servo. In the former case this procedure will normally be repeated for each disk surface (since only one surface can be written to by the product heads at any one time). Note that if a dedicated servo pattern is being recorded, there is no necessity for this to be on the same disk surface as the clock track.

It is necessary to maintain the product head at a constant radius whilst writing the servo pattern. With the present invention this involves monitoring the actuator position from outside the HDA. Suitable techniques are generally based on laser interferometry and involve the optical reflection of light from the actuator. For example, a plane mirror can be attached to a linear actuator, perpendicular to the direction of actuator travel. The position of the actuator is then measured by using a laser beam from outside the HDA travelling parallel to the direction of motion of the actuator, the beam being reflected off the mirror back out of the HDA, through the window 350 towards the interferometer. A similar technique can be used with a rotary actuator, but this time corner cube mirrors must be used to ensure that the reflected laser beam exits the HDA through the same window that it entered. Various other methods are also described in the literature: see e.g. European Application 91111003.9 (YO9-90-013), or IBM TDB Vol. 33-11, p. 428, "Head Positioning to Servowrite Magnetic Disk Files."

For the present invention, the most convenient arrangement is to write the clock track on either the top or bottom disk surface. In this case, a window in the HDA can be positioned directly above or below the clock track (as appropriate), to allow the MO head ready access to the disk surface. The window can be made of glass, perspex, or any other suitable transparent material. Some care needs to be taken with the incorporation of the window into the HDA housing, which is typically an aluminum casting, in order to avoid acoustic problems or loss of rigidity, and to prevent leakage into or out of the HDA, but these difficulties are no greater than those surmounted for the inclusion of the traditional breather filter.

Magneto-optic heads such as the one in FIG. 3a can be purchased as complete units and are designed to operate with a track pitch of 1-2 $\mu$m. By contrast magnetic hard disk drives use track pitches of perhaps 10 $\mu$m. The bit lengths used in both systems are similar at around 1-2 $\mu$m, and modern hard magnetic disks have an almost optical quality, providing a high degree of reflectivity. Furthermore, both systems use high coercivity material for the magnetic layer on the disks, so that the field strengths are comparable. Thus the invention can be readily implemented by a simple adaptation of conventional MO heads.

What is claimed is:

1. A method of servo-writing a magnetic disk drive, said disk drive including a head-disk assembly (HDA) which has a substantially sealed housing, one or more coaxial, rotatable magnetic data storage disks, located within the housing, a magnetic transducer head for each data storage disk for data transfer therewith located within the housing, and means located within the housing for moving the transducer heads in unison radially across the disk surfaces, said substantially sealed housing having a window for viewing a circular clock track on one of the magnetic data storage disks, said method comprising the steps of:

writing a circular clock track within the sealed HDA at radius R1 using a Monte Carlo technique;

moving the transducer heads to radius R2;

reading through said window the clock track by measuring the change in polarization of light reflected from the disk surface using a magneto-optical head outside said sealed HDA; and simultaneously with said step of reading the clock track, writing a servo track at radius R2 with said transducer heads, the timing of the transitions for said servo track at radius R2 being determined by the timing of the transitions read from said clock track.

2. The method of claim 1, wherein said Monte Carlo technique comprises the steps of:

writing a trial clock track with an estimated transition frequency;

verifying against predetermined specifications the closure and number of transitions of said trial clock track; and repeating the above steps until a clock track is written that meets said predetermined specifications.

3. The method of claim 1, wherein the clock track is written on one of the outermost disk surfaces.

4. The method of claim 3, wherein the clock track is written outside the location of the servo outer guardband.

5. The method of claim 1, wherein the magneto-optical read beam is directed onto the disk through one part of an optical element, and wherein the reflected beam passes though a different part of said optical element.

6. The method of claim 1, further comprising the steps of repeatedly, until the disk drive is fully servo-written:

moving the transducer heads to a new radius;

reading the clock track by measuring the change in polarization of light reflected from the disk surface using a magneto-optical head outside said sealed HDA; and simultaneously with said step of reading the clock track, writing a servo track at said new radius with said transducer heads, the timing of the transitions for said servo track at said new radius being determined by the timing of the transitions read from said clock track.

7. A system for servo-wiring a magnetic disk drive which has a substantially sealed housing and one or more coaxial, rotatable magnetic data storage disks, located within the housing, comprising:

a magnetic transducer head positioned inside the sealed disk drive, for writing a clock track at radius R1 and for writing a servo track at radius R2;

a transparent window, located at one axial end of the disk stack, through which an optical beam directed at an outermost disk surface may enter the disk drive, and through which the component of the optical beam reflected from the disk surface may exit the disk drive; and a magneto-optical head, positioned external to the sealed disk drive adjacent the transparent window, for producing the optical beam and reading the clock track through the transparent window by measuring the change in polarization of light reflected from the disk surface.

8. The system as recited in claim 7, wherein the magneto-optical head operates simultaneously with the magnetic transducer head to provide clocking signals which determine the timing of the transitions for the servo track written by the magnetic transducer head.

9. The system as recited in claim 8, wherein the clock track is located on the outermost disk surface adjacent the transparent window.

* * * * *

UNITED STATES PATENT AND TRADEMARK OFFICE
CERTIFICATE OF CORRECTION

PATENT NO.   :   5,339,204
DATED        :   August 16, 1994
INVENTOR(S)  :   James et al It is certified that error appears in the above-indentified patent and that said Letters Patent is hereby corrected as shown below:

Column 10, line 7, please change "servo-wiring" to --servo-writing--.

Signed and Sealed this

Tenth Day of January, 1995

Attest:

BRUCE LEHMAN

Attesting Officer

Commissioner of Patents and Trademarks